United States Patent Office

3,560,466
Patented Feb. 2, 1971

3,560,466
ISOLATION OF CHEMICAL REACTANTS
Geir Bjornson, Bartlesville, Okla., assignor to Phillips Petroleum Company, a corporation of Delaware
No Drawing. Filed Apr. 4, 1966, Ser. No. 539,629
Int. Cl. C08f 1/62, 3/26
U.S. Cl. 260—92.1                                    4 Claims

ABSTRACT OF THE DISCLOSURE

A new and improved process for carrying out a chemical reaction comprising the encapsulation of at least one of the components in at least one body of ice to prevent the prereaction between that component and any of the other components until at least the time when all remaining componens are charged into the reaction zone.

---

This invention relates to a method of carrying out a chemical reaction.

Heretofore certain components for a chemical reaction which could not be contacted with the other component of the chemical reaction until the time the reaction was to be initiated were isolated by use of frangible glass ampoules. The ampoules were then broken in situ to release their contents only after all other components for the reaction had been charged to the reaction zone. In many cases difficulty is encountered in breaking the ampoules in situ and even more difficulties are involved in ascertaining that all the ampoules present have been broken and their contents released. Further, this technique introduces glass particles into the product of the reaction which in most cases are very difficult, if not impossible, to separate therefrom.

It has now been found that components for a chemical reaction can be separated until the time of initiation of the reaction without introducing a totally foreign material to the reaction mixture and at the same time assuring that all of the isolated components are released for reaction by encapsulating the components to be isolated in a block of ice having a sufficient overall wall thickness so that the block will not melt sufficiently to free the encased components until all reactants, catalyst components, additives, and the like are charged to the reaction zone wherein the block of ice is situated.

Accordingly, it is an object of this invention to provide a new and improved process for carrying out a chemical reaction.

Other aspects, objects, and the several advantages of this invention will be apparent to those skilled in the art from the description and appended claims.

This invention is applicable to any chemical reaction process which can tolerate the presence of a minor amount of water, i.e. a process wherein water is a substantially inert diluent to the reactants, catalyst, products, and the like. An area of particular application of this invention is in the use of redox catalyst systems, for example those systems where metal salts such as ferrous sulfate or silver nitrate are used as the oxidizing agent. In these systems the metal cations present can use up the catalyst before it is possible to charge all of the reactants, for example monomer or monomers, to the reaction zone which contains the catalyst system.

Applicable catalyst systems for the technique of this invention include redox systems wherein the oxidant in the water suspension-type recipe is an inorganic persulfate such as potassium persulfate, sodium persulfate, or ammonium persulfate, and the reductant is a bisulfite, such as potassium bisulfites, sodium bisulfite, potassium metabisulfite, sodium meta-bisulfite, and the like. Variable valence metal salts can also be employed with these catalysts such as iron salts, e.g. ferrous sulfate, ferrous nitrate, and the like. These variable valence metal salts can be employed with the above-mentioned oxidants and without the above-mentioned reductants. Also, emulsion catalyst systems containing water, soap, and a peroxy compound are amenable to a technique of this invention. One type is a polymerization initiator using a redox system comprising an organic oxidant and an activator solution dissolved in water. Organic oxidants include cumene hydroperoxide, diisopropylbenzene hydroperoxide, methylcyclohexane hydroperoxide, tertiary-butyl perbenzoate, tertiary-butyl hydroperoxide, and the like. Typical activator solutions include aqueous solutions of variable valence metal salts such as ferrous sulfate, sodium thiophosphate, reducing sugars such as dextrose, and the like.

The emulsifier employed in redox or persulfate emulsions catalyst systems application to the technique of this invention can be a metal salt such as the potassium or sodium salts derived from saturated aliphatic acids having from 14 to 20 carbon atoms per molecule, inclusive, or from polyfluorocarboxylic acids or polyfluorochlorocarboxylic acids, and the like.

The thickness of the walls of ice around the isolated components can vary widely depending upon the reaction system, temperatures of the reaction zone, reactant feed rate, and the like. Generally, the thickness of the walls that surround the encased components will be that which is at least sufficient to prevent the ice block from melting sufficiently to free the encased components until all of the materials desired are charged to the reaction zone which contains the ice block. The thickness can vary widely so as to free all the components at substantially the same time or to sequentially free the components (the components in this case being in a plurality of ice capsules, the capsules themselves having varying ice wall thicknesses) and thereby provide a substantially constant fresh supply of components to the reaction notwithstanding the fact that the reaction system is sealed as to prevent the addition of more reactants once the reaction is initiated. Generally, the ice wall thickness will be in the range of from about 2 to about 5 millimeters.

Thus, the ice encapsulated components can be charged to the reaction zone first or at any point intermediate the charging the first and last components, the amount of ice required to be around the isolated components decreasing as the ice encapsulated components are charged closer in time to the charging of the last component to the reaction zone.

Thus, by this invention one can charge an ice encapsulated component as the first material to go into the reaction zone and then add the reactants, e.g. monomers of polymers to be formed, the other catalyst components which must be contacted with the encapsulated components to form the catalyst desired, and any additives or modifying agents which are desired to be present in the final product and can be sure that the encapsulated components and other catalytic components will not contact one another until all reactants, additives, and the like are present and also be sure that all encapsulated components will be freed.

Of course, the time required for freeing encapsulated components can be varied by varying the temperature of the reaction zone prior to initiation of the reaction.

EXAMPLE

Tetrafluoroethylene was polymerized using a potassium persulfate-ferrous sulfate catalyts system. In Run 1 the potassium persulfate and ferrous sulfate were charged together in distilled water to the reaction zone after which the tetrafluoroethylene was added. In Run 2 the ferrous sulfate was encapsulated in a glass ampoule and after the potassium persulfate and tetrafluoroethylene were added to the reaction zone and the reaction zone sealed the glass ampoule was attempted to be broken with the stirring mechanism associated with the reaction zone. In Run 3 the ferrous sulfate was encapsulated in an ice block so that the ice would not melt and free the ferrous sulfate until all the potassium persulfate was added to the reaction zone, the reaction zone sealed, and the desired amount of tetrafluoroethylene pressured into the reaction zone. The polymerization conditions and results of the polymerization are set forth in Table I as follows:

TABLE I

| Run No. | Monomer | Initiator system | Initiation temperature (°F.) | Initial pressure (p.s.i.g.) | Final pressure (p.s.i.g.) | Polymerization length | Amount of polymer made (g.) | Conv. (percent) | Yield of polymer g. (polymer)/g. (initiator) | Remarks |
|---|---|---|---|---|---|---|---|---|---|---|
| 1 | $CF_2=CF_2$ | $K_2S_2O_8$, 118 p.p.m.; $FeSO_4 \cdot 7H_2O$, 122 p.p.m. in 250 ml. boiled distilled $H_2O$. | 90 | 395 | 245 | 100 | 68.3 | 30 | 2,307 | White, fluffy polymer ([1]) recovered. |
| 2 | $CF_2=CF_2$ | Same as Run 1, $FeSO_4 \cdot 7H_2O$ encapsulated in glass ampoule. | 90 | 390 | 330 | 115 | | | | No polymer, ampoule did not break, $K_2S_2O_8$ did not generate enough free radicals by itself. |
| 3 | $CF_2=CF_2$ | Same as Run 1, $FeSO \cdot 7H_2O$ encapsulated in ice block having average ice wall thickness of about 3 millimeters. | 90–120 | 370 | 140 | 30 | 104.5 | 51 | 3,530 | White, fluffy polymer ([1]) recovered. |

[1] Melting point, infrared spectra and X-ray diffraction patterns of polymer substantially the same as commercial polytetrafluoroethylene.

By this example it can be seen that by following the technique of this invention release of all the encapsulated ferrous sulfate was insured while maintaining the ferrous sulfate in an isolated condition until the polymerization reaction was desired to be initiated and that because of this substantially greater amount of polymer was obtained per gram of initiator employed.

Reasonable variations and modifications are possible within the scope of this disclosure without departing from the spirit and scope thereof.

I claim:

1. In a water tolerant chemical reaction wherein at least one component for the reaction must be separated from remaining components until the reaction is to be initiated, the improvement comprising encapsulating said at least one component in at least one body of ice having a sufficient overall wall thickness so that the ice body will not melt sufficiently to free the encapsulated at least one component until said remaining components are charged to the reaction zone.

2. The method according to claim 1 wherein said chemical reaction components comprise at least one reactant and at least one catalyst formed from at least two components, the catalytic effect of the catalyst deteriorating in direct proportion with the length of time of contacting of the at least two components, and the improvement being encapsulating at least one of the two components of said catalyst system in said body of ice.

3. The method according to claim 2 wherein the catalyst system is a redox system.

4. The method according to claim 2 wherein said chemical reaction is the polymerization of tetrafluoroethylene, the catalyst system is potassium persulfate and ferrous sulfate and the ferrous sulfate is encapsulated in the ice body.

References Cited

UNITED STATES PATENTS 3,167,602   1/1965   Bentov et al. _____ 264—4
3,179,637   3/1965   Brodt et al. _____ 260—79.5

JOSEPH L. SCHOFER, Primary Examiner

J. A. DONOHUE, JR., Assistant Examiner

U.S. Cl. X.R.
252—313; 264—4